US012471016B2

(12) United States Patent
Lin et al.

(10) Patent No.: US 12,471,016 B2
(45) Date of Patent: Nov. 11, 2025

(54) UE ACCESS IDENTITY DETERMINATION FOR 3GPP AND NON-3GPP ACCESSES

(71) Applicant: MEDIATEK INC., Hsin-Chu (TW)

(72) Inventors: Yuan-Chieh Lin, Hsin-Chu (TW);
Yung-Chun Yang, Hsin-Chu (TW);
Yu-Hsin Lin, Hsin-Chu (TW)

(73) Assignee: MediaTek Inc., Hsinchu (TW)

( * ) Notice: Subject to any disclaimer, the term of this patent is extended or adjusted under 35 U.S.C. 154(b) by 329 days.

(21) Appl. No.: 18/218,101

(22) Filed: Jul. 4, 2023

(65) Prior Publication Data

US 2024/0040496 A1    Feb. 1, 2024

Related U.S. Application Data

(60) Provisional application No. 63/369,671, filed on Jul. 28, 2022.

(51) Int. Cl.
*H04W 48/18* (2009.01)
*H04W 48/16* (2009.01)
*H04W 60/00* (2009.01)

(52) U.S. Cl.
CPC ........... *H04W 48/18* (2013.01); *H04W 48/16* (2013.01); *H04W 60/00* (2013.01)

(58) Field of Classification Search
CPC ...... H04W 48/18; H04W 48/16; H04W 60/00
USPC ....................................................... 455/434
See application file for complete search history.

(56) References Cited

U.S. PATENT DOCUMENTS

| 8,855,099 | B2 * | 10/2014 | Kitazoe | H04W 76/10 |
| | | | | 370/437 |
| 10,750,551 | B2 * | 8/2020 | Ianev | H04W 4/20 |
| 11,019,556 | B2 * | 5/2021 | Choe | H04W 76/10 |
| 11,812,508 | B2 * | 11/2023 | Jin | H04W 76/30 |
| 11,968,614 | B2 * | 4/2024 | Niemi | H04W 8/08 |
| 11,985,585 | B2 * | 5/2024 | Drevon | H04W 48/02 |
| 2010/0112992 | A1 * | 5/2010 | Stadler | H04W 8/26 |
| | | | | 455/415 |
| 2011/0044274 | A1 * | 2/2011 | Lee | H04W 76/18 |
| | | | | 370/329 |

(Continued)

OTHER PUBLICATIONS

European Intellectual Property Office Action 23187478.5-1216, dated Dec. 15, 2023 (6 pages).

(Continued)

*Primary Examiner* — Mark G. Pannell
(74) *Attorney, Agent, or Firm* — Helen Mao; Zheng Jin; Imperium Patent Works

(57) ABSTRACT

A method of determining UE access identity for a UE that is registered to the same or different PLMN networks over 3GPP and non-3GPP accesses is proposed. The UE registers to one or more Public Land Mobile Network (PLMN) or Standalone Non-Public Network (SNPN) over 3GPP access and non-3GPP access. If the UE registers to the same PLMN/SNPN over 3GPP and non-3GPP access, then the UE handles the UE access identity as one common parameters. On the other hand, if the UE registers to different PLMN/SNPN over 3GPP and non-3GPP, then the UE handles the UE access identity as two independent parameters. The access identity may comprise a priority indicator IE that is set to "Access Identity 1 valid" for MPS or "Access Identity 2 valid" for MCS.

20 Claims, 5 Drawing Sheets

(56) References Cited

U.S. PATENT DOCUMENTS

| | | | |
|---|---|---|---|
| 2014/0029594 A1* | 1/2014 | Lee | H04W 48/12 |
| | | | 370/336 |
| 2014/0213264 A1* | 7/2014 | Park | H04W 36/0064 |
| | | | 455/438 |
| 2016/0183175 A1* | 6/2016 | Keller | H04W 8/24 |
| | | | 370/328 |
| 2017/0142706 A1* | 5/2017 | Kim | H04W 80/10 |
| 2018/0027414 A1* | 1/2018 | Li | H04W 12/06 |
| | | | 455/435.1 |
| 2019/0230585 A1* | 7/2019 | Chun | H04L 63/102 |
| 2019/0268752 A1* | 8/2019 | Buckley | H04W 8/06 |
| 2019/0349849 A1* | 11/2019 | Kavuri | H04W 8/18 |
| 2020/0092710 A1* | 3/2020 | Kim | H04W 60/00 |
| 2020/0137672 A1* | 4/2020 | Rommer | H04W 68/005 |
| 2020/0296575 A1* | 9/2020 | Lu | H04W 8/22 |
| 2021/0007041 A1* | 1/2021 | Wallentin | H04W 8/18 |
| 2021/0092664 A1* | 3/2021 | Lai | H04W 8/08 |
| 2022/0030538 A1* | 1/2022 | Tiwari | H04W 60/005 |
| 2023/0232369 A1* | 7/2023 | Lin | H04W 60/005 |
| | | | 455/435.1 |
| 2023/0309048 A1* | 9/2023 | Baek | H04W 8/02 |
| 2023/0362743 A1* | 11/2023 | Hwang | H04W 36/00226 |
| 2024/0089887 A1* | 3/2024 | John | H04W 60/00 |
| 2024/0155535 A1* | 5/2024 | Lin | H04W 60/06 |

OTHER PUBLICATIONS

Yu-Shin(Tony) Lin et al: "NW handling when treating an MRU as an initial registration", 3GPP Draft; C1-232439; Type CR; CR 5295; 5GPROJECT18,$3^{RD}$ Generation Partnership Project(3GPP), vol. G3GPP CT1, No. Apr. 17, 2023-Apr. 21, 2023, XP 052294844.

* cited by examiner

| RULE | ACCESS IDENTITIES | ACCESS CATEGORIES | RRC ESTABLISHMENT CAUSE |
|---|---|---|---|
| 1 | 1 | ANY CATEGORY | MPS PRIORITY ACCESS |
| 2 | 2 | ANY CATEGORY | MCS PRIORITY ACCESS |
| 3 | 11, 15 | ANY CATEGORY | HIGH PRIORITY ACCESS |
| 4 | 12, 13, 14 | ANY CATEGORY | HIGH PRIORITY ACCESS |
| 5 | 0 | 0 | MT-ACCESS |
| 5 | 0 | 1 | NOT APPLICABLE |
| 5 | 0 | 2 | EMERGENCY |
| 5 | 0 | 3 | MO-SIGNALING |
| 5 | 0 | 4 | MO-VOICE CALL |
| 5 | 0 | 5 | MO-VIDEO CALL |
| 5 | 0 | 6 | MO-SMS |
| 5 | 0 | 7 | MO-DATA |
| 5 | 0 | 9 | MO-DATA |

FIG. 3

| RULE | ACCESS IDENTITIES | TYPE OF ACCESS ATTEMPT | REQUIREMENTS TO BE MET | ESTABLISHMENT CAUSE for non-3GPP ACCESS |
|---|---|---|---|---|
| 1 | 1 | ANY | ANY | MPS PRIORITY ACCESS |
| 2 | 2 | ANY | ANY | MCS PRIORITY ACCESS |
| 3 | 11, 15 | ANY | ANY | HIGH PRIORITY ACCESS |
| 4 | 12, 13, 14 | ANY | ANY | HIGH PRIORITY ACCESS |
| 5 | 0 | EMERGENCY | EMERGENCY | EMERGENCY |
| 5 | 0 | UE NAS INITIATED | MO SIGNALING | MO-SIGNALING |
| 5 | 0 | UE NAS INITIATED | MO DATA | MO-DATA |
| 5 | 0 | MO-SMS OVER NAS/IP | MO-SMS OVER NAS/IP | MO-SMS |
| 5 | 0 | MO MMTEL | MO MMTEL | MO-VOICE CALL |

FIG. 4

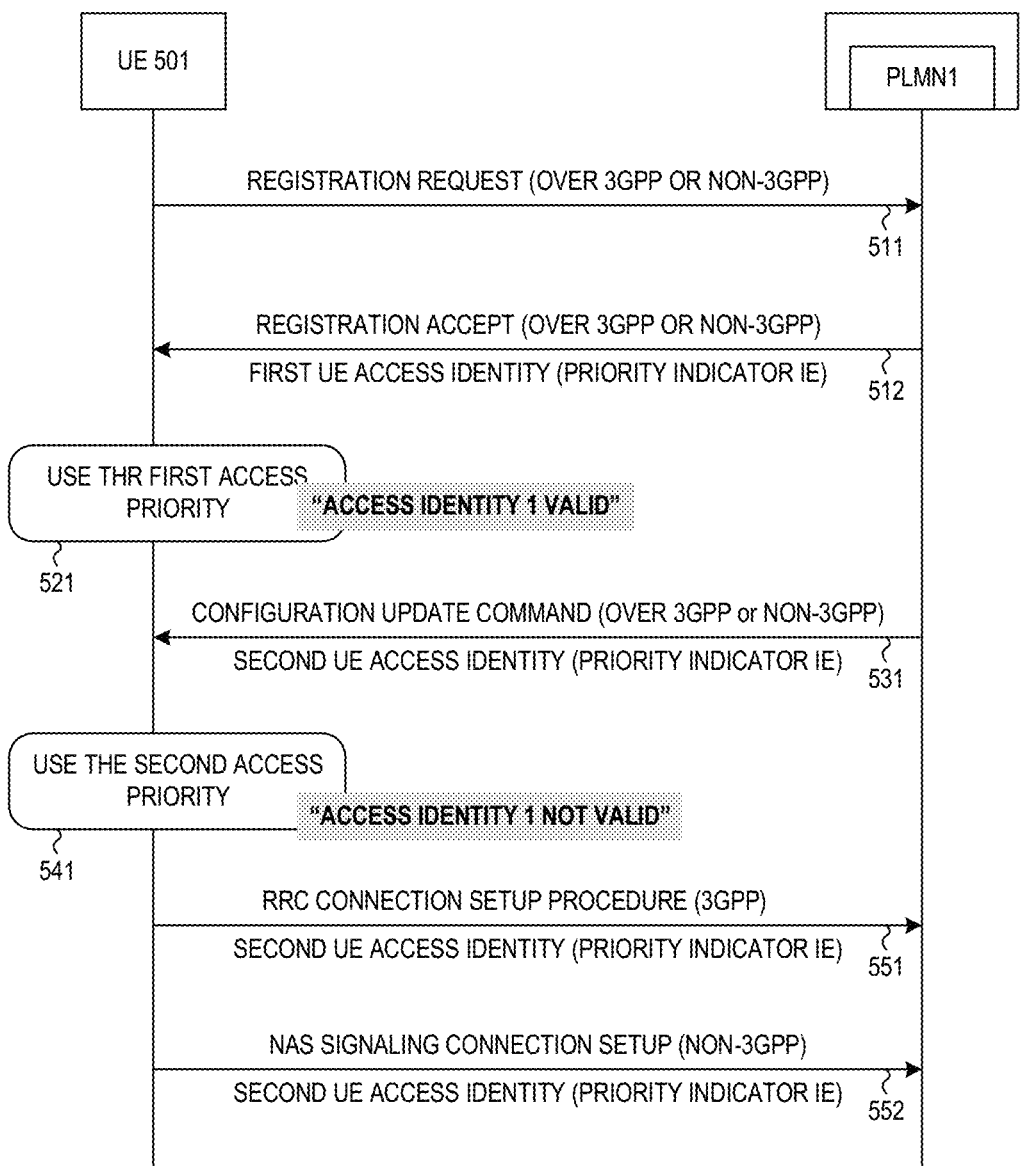
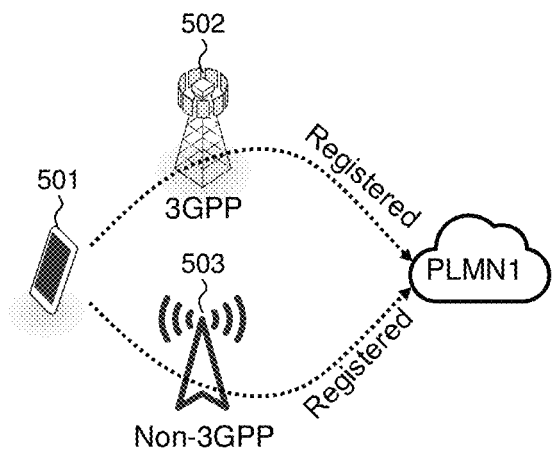
FIG. 5

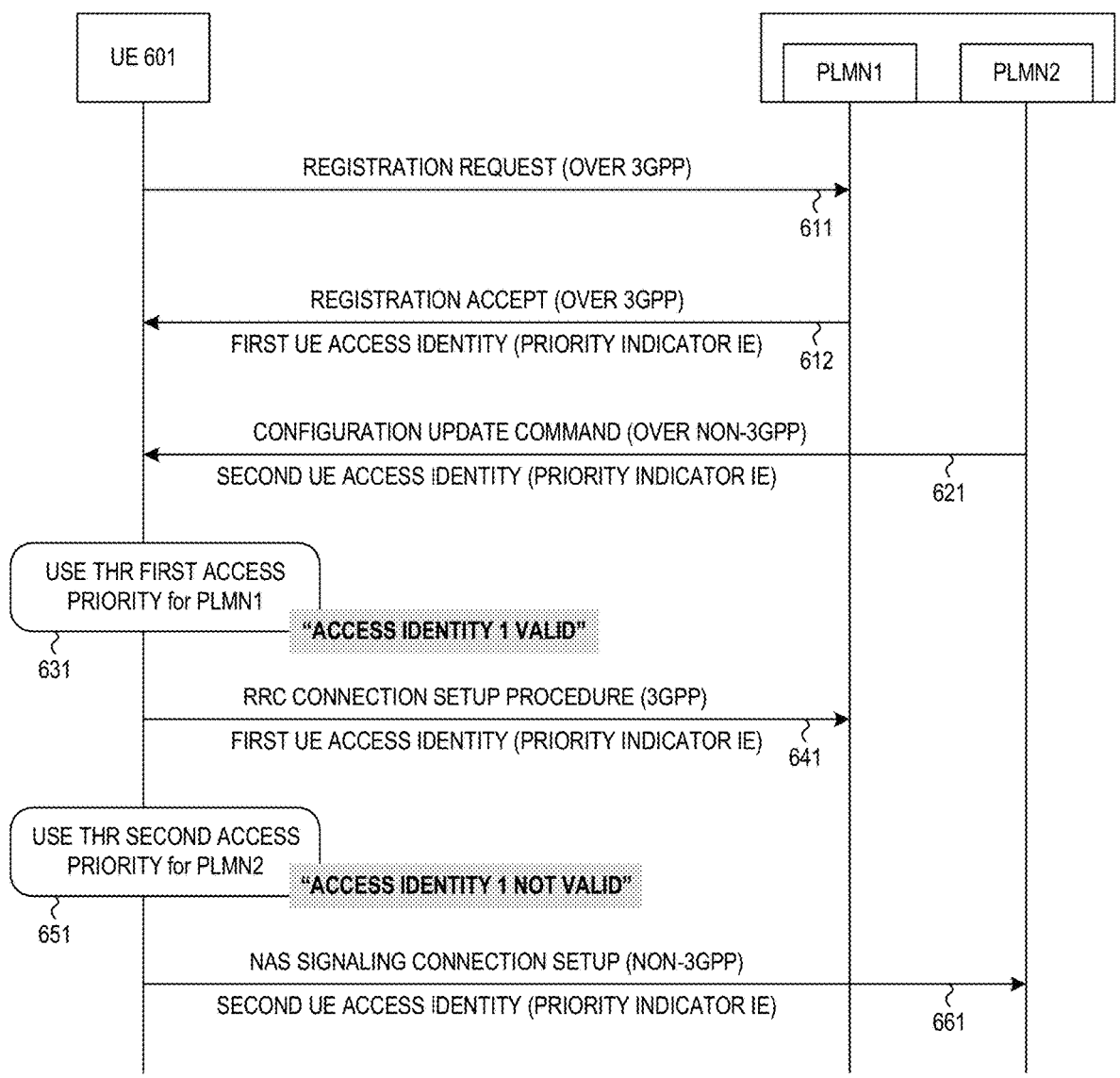
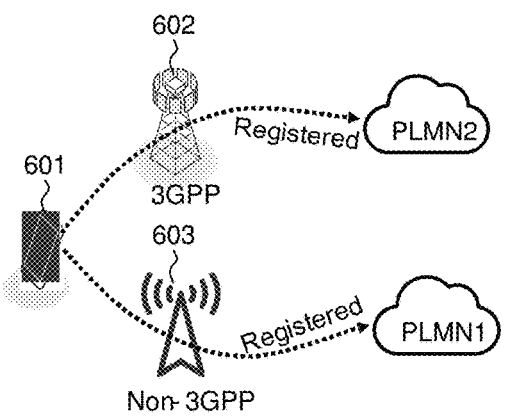
FIG. 6

UE ACCESS IDENTITY DETERMINATION FOR 3GPP AND NON-3GPP ACCESSES

CROSS REFERENCE TO RELATED APPLICATIONS

This application claims priority under 35 U.S.C. § 119 from U.S. Provisional Application No. 63/369,671, entitled "UE Access Identity determination for 3GPP and non-3GPP accesses", filed on Jul. 28, 2022, the subject matter of which is incorporated herein by reference.

TECHNICAL FIELD

The disclosed embodiments relate generally to wireless communication, and, more particularly, to UE access identity information handling when UE is registered to one or two networks via both 3GPP access and non-3GPP access.

BACKGROUND

Third generation partnership project (3GPP) and 5G New Radio (NR) mobile telecommunication systems provide high data rate, lower latency and improved system performances. In 3GPP NR, 5G terrestrial New Radio (NR) access network (includes a plurality of base stations, e.g., Next Generation Node-Bs (gNBs), communicating with a plurality of mobile stations referred as user equipment (UEs). Orthogonal Frequency Division Multiple Access (OFDMA) has been selected for NR downlink radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition.

Multimedia Priority Service (MPS) has been developed to provide special high-priority access with a very selective group of users in mind and applies to the end-to-end session. The target users are usually authorized government, security, and special service users who need to be able to maintain communications via public mobile networks during special situations where public safety and security may be at risk. Such assignment is only allowed by regional/national authorities and is done through the mobile operator subscription mechanism with support for a special subscription profile for Multimedia Priority Service. In reality, the benefit of an MPS user is seen during adverse situations like natural disasters, security threats, etc. coinciding with possible failure of any possible private networks that may be otherwise used for priority/emergency communication by authorities. Since reserving a certain network capacity for this type of usage takes away possible service availability from regular users for that PLMN operator, there may be a limit depending on the situation and regional/local regulations on how much of the traffic volume can be reserved for MPS usage.

An MPS service user can benefit from a 3GPP system compared to a normal user. A system that supports MPS is able to provide end-to-end priority access to that MPS service user according to the level of priority assigned by the appropriate authority in situations like congestion or special disaster events. This is indicated by the MPS priority level.

Similar to MPS, Mission Critical Service (MCS) has been developed to provide special high-priority access with a very selective group of users in mind and applies to the end-to-end session. An MCS service user can benefit from a 3GPP system compared to a normal user. A system that supports MCS is able to provide end-to-end priority access to that MCS service user according to the level of priority assigned by the appropriate authority. This is indicated by the MCS priority level.

The MPS indicator (i.e., Access identity 1 is valid or not) and MCS indicator (i.e., Access identity 2 is valid or not) is applicable commonly to 3GPP and non-3GPP access. When the UE is registered to different NW (PLMN(s) or SNPN(s)) over 3GPP access and non-3GPP access, the MPS/MCS indicators included in the latest registration procedure (or configuration update procedure) over the first access will be applied also to second access, which is not an appropriate behavior.

A solution is sought.

SUMMARY

A method of determining UE access identity for a UE that is registered to the same or different PLMN networks over 3GPP and non-3GPP accesses is proposed. The UE registers to one or more Public Land Mobile Network (PLMN) or Standalone Non-Public Network (SNPN) over 3GPP access and non-3GPP access. If the UE registers to the same PLMN/SNPN over 3GPP and non-3GPP access, then the UE handles the UE access identity as one common parameters. On the other hand, if the UE registers to different PLMN/SNPN over 3GPP and non-3GPP, then the UE handles the UE access identity as two independent parameters. The access identity may comprise a priority indicator IE that is set to "Access Identity 1 valid" or "Access Identity 1 invalid" for MPS, or "Access Identity 2 valid" or "Access Identity 2 invalid" for MCS.

In one example, if the UE receives a CONFIGURATION UPDATE COMMAND or REGISTRATION ACCEPT message with the MPS indicator bit in the Priority indicator IE set to "Access identity 1 valid" from a network via 3GPP access or via non-3GPP access if the UE is registered to the same PLMN or SNPN over 3GPP access and non-3GPP access, then the UE shall act as a UE with access identity 1 configured for MPS, in all NG-RAN of the registered PLMN or in the case of SNPN in all NG-RAN of the registered SNPN. In another example, if the UE receives a CONFIGURATION UPDATE COMMAND or REGISTRATION ACCEPT message with the MPS indicator bit in the Priority indicator IE set to "Access identity 1 valid" from a network via non-3GPP access or via 3GPP access if the UE is registered to the same PLMN or SNPN over 3GPP access and non-3GPP access, then the UE shall act as a UE with access identity 1 configured for MPS, in non-3GPP access of the registered PLMN or in the case of SNPN, in non-3GPP access of the registered SNPN.

In one embodiment, a UE maintains a first access identity, wherein the UE is registered to a first network via a first access type. The UE receives a REGISTRATION ACCEPT or a CONFIGURATION UPDATE COMMAND message over a second access type from a second network, wherein the message carries a second access identity. The UE uses the first access identity to determine a first access priority for accessing the first network when the first network and the second network are different networks, otherwise, the UE uses the second access identity to determine a second access priority for accessing the first network when the first network and the second network are same.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 illustrates a mapping table for access identities or access categories and RRC establishment cause for 3GPP access.

FIG. 4 illustrates a mapping table for access identities and determination of establishment cause for non-3GPP access.

FIG. 5 illustrates one embodiment of UE access identity determination when a UE is registered to the same network over 3GPP access and non-3GPP access in accordance with one novel aspect.

FIG. 6 illustrates one embodiment of UE access identity determination when a UE is registered to different networks over 3GPP access and non-3GPP access in accordance with one novel aspect.

DETAILED DESCRIPTION

Reference will now be made in detail to some embodiments of the invention, examples of which are illustrated in the accompanying drawings.

Figure 1:
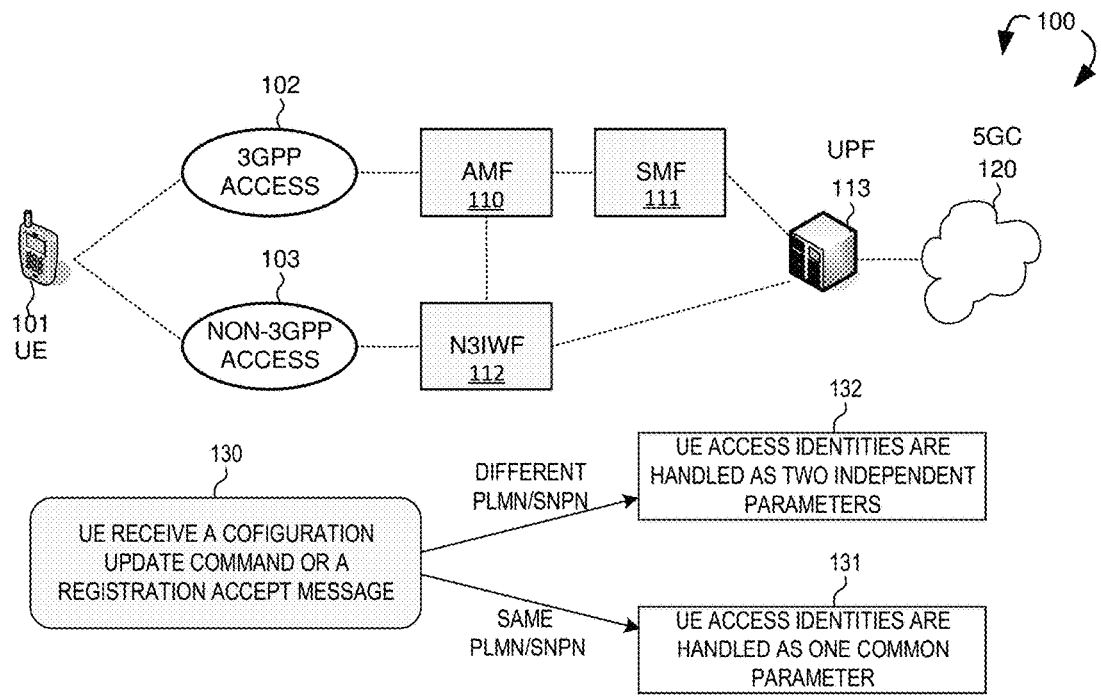
FIG. 1 illustrates an exemplary 5G network and a method of determining access identity when a User Equipment (UE) is registered to the same or different networks over 3GPP access and non-3GPP access in accordance with one novel aspect.

FIG. 1 illustrates an exemplary 5G network and a method of determining access identity when a User Equipment (UE) is registered to the same or different networks over 3GPP access and non-3GPP access in accordance with one novel aspect. 5G new radio (NR) network 100 comprises a user equipment (UE) 101, a 3GPP access 102 (e.g., a 3GPP radio access network (RAN)), a non-3GPP access 103 (e.g., a non-3GPP RAN), an access and mobility management function (AMF) 110, a session management function (SMF) 111, a non-3GPP interworking function (N3IWF) 112, a user plane function (UPF) 113, and a 5G core (5GC) data network 120. The AMF 110 communicates with the base stations in the 3GPP access 102, the SMF 111, and the UPF 113 for access and mobility management of wireless access devices in the 5G network 100. The SMF 111 is primarily responsible for interacting with the decoupled data plane, creating, updating, and removing PDU sessions and managing session context with the UPF 113. The N3IWF 112 interfaces to 5G core network control plane functions, responsible for routing messages outside 5G RAN.

In Access Stratum (AS) layer, an RAN provides radio access for the UE 101 via a radio access technology (RAT). In Non-Access Stratum (NAS) layer, the AMF 110 and the SMF 111 communicate with RAN and 5GC for access and mobility management and PDU session management of wireless access devices in the 5G network 100. The 3GPP access 102 may include base stations (gNBs or eNBs) providing radio access for the UE 101 via various 3GPP RATs including 5G, 4G, and 3G/2G. The non-3GPP access 103 may include access points (APs) providing radio access for the UE 101 via non-3GPP RAT including WiFi. The UE 101 can obtain access to data network 120 through 3GPP access 102, AMF 110, SMF 111, and UPF 113. The UE 101 can obtain access to data network 120 through non-3GPP access 103, N3IWF 112, AMF 110, SMF 111, and UPF 113. The UE 101 may be equipped with a single radio frequency (RF) module or transceiver or multiple RF modules or transceivers for services via different RATs/CNs. In some examples, UE 101 may be a smart phone, a wearable device, an Internet of Things (IoT) device, a tablet, etc.

A PDU session defines the association between the UE and the data network that provides a PDU connectivity service. Each PDU session is identified by a PDU session ID, and can be established over a 3GPP RAN, and/or over a non-3GPP RAN. 5G session management (5GSM) for PDU sessions over both 3GPP access and non-3GPP access are managed by AMF and SMF via NAS signaling. Multimedia Priority Service (MPS) has been developed to provide special high-priority access with a very selective group of users in mind and applies to the end-to-end session. A system that supports MPS is able to provide end-to-end priority access to that MPS service user according to the level of priority assigned by the appropriate authority. Similar to MPS, Mission Critical Service (MCS) has been developed to provide special high-priority access with a very selective group of users in mind and applies to the end-to-end session. A system that supports MCS is able to provide end-to-end priority access to that MCS service user according to the level of priority assigned by the appropriate authority.

The prioritized MPS/MCS can be indicated by the MPS/MCS priority level via UE access identity. In the example of FIG. 1, UE 101 knows it is configured for MPS, i.e., Access identity 1 valid: 1) if in the USIM file $EF_{UAC\_AIC}$ indicates the UE is configured for access identity 1, or 2) if the UE receives REGISTRATION ACCEPT message or CONFIGURATION UPDATE COMMAND message with the MPS indicator bit set is to "Access identity 1 valid". Then, UE 101 determines: it is configured for multimedia priority service (MPS), i.e., Access identity 1 valid. Similarly, UE 101 knows it is configured for MCS, i.e., Access identity 2 valid: 1) if in the USIM file $EF_{UAC\_AIC}$ indicates the UE is configured for access identity 2, or 2) if the UE receives REGISTRATION ACCEPT message or CONFIGURATION UPDATE COMMAND message with the MCS indicator bit set is to "Access identity 2 valid". Then, UE 101 determines: it is configured for mission critical service (MCS), i.e., Access identity 2 valid. The MPS indicator (i.e., Access identity 1 is valid or not) and MCS indicator (i.e., Access identity 2 is valid or not) is applicable commonly to 3GPP and non-3GPP access. When the UE is registered to both a 3GPP access and a non-3GPP access, it is undefined how the UE should determine the UE access identity obtained over 3GPP access or non-3GPP access.

In accordance with one novel aspect, a method of determining access identity when UE is registered to the same or different PLMN/SNPN over 3GPP/non-3GPP is proposed. When the UE is registered to the same PLMN or SNPN over 3GPP and non-3GPP access, the UE and the AMF maintain one MPS indicator and one MCS indicator that are common to both 3GPP and non-3GPP access. When the UE is registered to different PLMNs or SNPNs over 3GPP access and non-3GPP access, the UE maintains two MPS indicators and two MCS indicators separately for different accesses i.e., a MPS indicator and a MCS indicator for the 3GPP access and another MPS indicator and a MCS indicator for the non-3GPP access. As depicted in FIG. 1 (130), UE 101 registers to one or more Public Land Mobile Network (PLMN) or Standalone Non-Public Network (SNPN) over 3GPP access and non-3GPP access and receives UE access identity via a CONFIGURATION UPDATE COMMAND message or a REGISTRATION ACCEPT message. If UE 101 registers to the same PLMN/SNPN over 3GPP and non-3GPP access, then UE 101 handles the UE access identity as one common parameters (131). On the other hand, if UE 101 registers to different PLMN/SNPN over 3GPP and non-3GPP, then UE 101 handles the UE access identity as two independent parameters (132).

Figure 2:
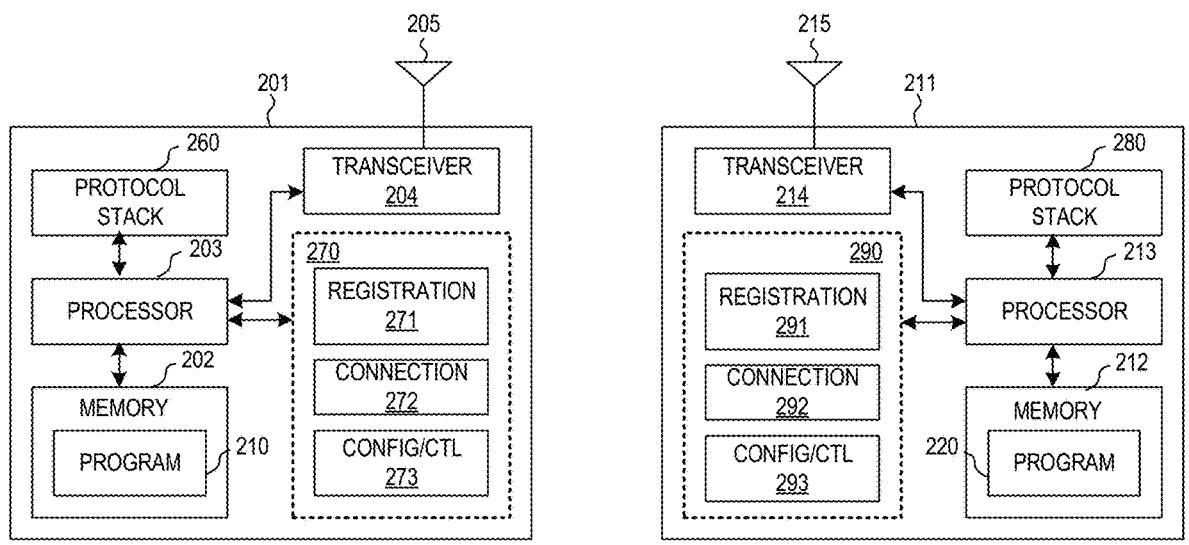
FIG. 2 illustrates simplified block diagrams of a user equipment (UE) and a network entity in accordance with embodiments of the current invention.

FIG. 2 illustrates simplified block diagrams of wireless devices, e.g., a UE 201 and a network entity 211 in accordance with embodiments of the current invention. Network entity 211 may be a base station and/or an AMF/SMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control function modules and circuits 290. Protocol stacks 280 includes Non-Access-Stratum (NAS) layer to communicate with an AMF/SMF/MME entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. In one example, control function modules and circuits 290 includes a registration circuit 291 that handles registration procedures, a connection handling circuit 292 that handles signaling connections, and a configuration and control circuit 293 that provides different parameters to configure and control UE of related functionalities including registration and paging. The network entity 211 can be one 5GS network component or more than one 5GS network components (e.g., access network+AMF+N3IWF+SMF, etc.)

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also includes protocol stacks 260 and a set of control function modules and circuits 270. Protocol stacks 260 includes NAS layer to communicate with an AMF/SMF/MME entity connecting to the core network, RRC layer for high layer configuration and control, PDCP/RLC layer, MAC layer, and PHY layer. Control function modules and circuits 270 may be implemented and configured by software, firmware, hardware, and/or combination thereof. The control function modules and circuits, when executed by the processors via program instructions contained in the memory, interwork with each other to allow UE 201 to perform embodiments and functional tasks and features in the network. In one example, control function modules and circuits 270 includes a registration handling circuit 271 that performs registration procedure with the network, an access and connection handling circuit 272 that handles RRC and NAS signaling connection, and a config and control circuit 273 that handles configuration and control parameters including determining UE access identity.

FIG. 3 illustrates a mapping table for access identities or access categories and RRC establishment cause for 3GPP access. There are two ways to make the MPS access different (higher priority) than others. First, in UAC (Unified Access Control) mechanism, the UE with Access identity 1 is treated separately (operator can configure not to bar the access at all). Second, a separate dedicated RRC establishment cause "mps-PriorityAccess" is used so the network can prioritize this kind of access. Similarly, there are two ways to make the MCS access different (higher priority) than others. First, in UAC mechanism, the UE with Access identity 2 is treated separately (operator can configure not to bar the access at all). Second, a separate dedicated RRC establishment cause "mcs-PriorityAccess" is used so the network can prioritize this kind of access.

FIG. 4 illustrates a mapping table for access identities and determination of establishment cause for non-3GPP access. Although UAC is only applicable to 3GPP access (NG-RAN), the establishment cause "mps-PriorityAccess" is applicable to both 3GPP and non-3GPP access, and the establishment cause "mcs-PriorityAccess" is applicable to both 3GPP and non-3GPP access. In one example, UE receives a CONFIGURATION UPDATE COMMAND message, or a REGISTRATION ACCEPT message with the MPS indicator bit in the Priority indicator IE set to "Access identity 1 valid" over non-3GPP access. In another example, UE receives a CONFIGURATION UPDATE COMMAND message, or a REGISTRATION ACCEPT message with the MCS indicator bit in the Priority indicator IE set to "Access identity 2 valid" over non-3GPP access.

FIG. 5 illustrates one embodiment of UE access identity determination when a UE is registered to the same network over 3GPP access and non-3GPP access in accordance with one novel aspect. In step 511, UE 501 registers to PLMN1 by sending a REGISTRATION REQUEST message over 3GPP access 502 or over non-3GPP access 503, the request message carries UE-Requested access identity information. In step 512, UE 501 receives a REGISTRATION ACCEPT message over 3GPP or non-3GPP access, the accept message carries UE access identity information, e.g., a first priority indicator IE. In step 521, UE 501 starts to apply the first priority indicator IE, e.g., act as being configured for "Access identity 1 valid" (MPS) in all NG-RAN of the registered PLMN1. For example, UE 501 sets the establishment cause to "mps-priority access" in a subsequent RRC setup request message when UE 501 accesses PLMN1 via NG-RAN.

In step 531, UE 501 receives a CONFIGURATION UPDATE COMMAND message from PLMN1 over 3GPP access 502 or over non-3GPP access 503, carrying UE access identity information, e.g., a second priority indicator IE. UE 501 then determines whether the UE is registered to the same or different PLMN/SNPN over 3GPP access and non-3GPP access. In the example of FIG. 5, UE 501 is registered to the same PLMN1 over 3GPP access 502 and non-3GPP access 503. Therefore, UE 501 handles the access identity for both 3GPP access and non-3GPP access as a common parameter. In another word, UE 501 handles and applies a common access priority, regardless of whether UE 501 receives the access identity information over 3GPP access or non-3GPP access. As a result, in step 541, UE 501 stores the second access identity information, and applies the second priority indicator IE, e.g., act as being configured for "Access identity 1 not valid" in all NG-RAN of the registered PLMN1. For example, in step 551, UE 501 performs RRC connection setup procedure over 3GPP access, and sets the establishment cause to "Access identity 1 not valid" in the RRC setup request message when UE 501 accesses PLMN1 via NG-RAN. In step 561, UE 501 performs a NAS signaling connection setup procedure over non-3GPP access, and applies "Access identity 1 not valid" when UE 501 accesses PLMN1 over non-3GPP.

FIG. 6 illustrates one embodiment of UE access identity determination when a UE is registered to different networks over 3GPP access and non-3GPP access in accordance with one novel aspect. In step 611, UE 601 registers to PLMN1 by sending a REGISTRATION REQUEST message over 3GPP access 602, the request message carries UE-Requested access identity information. In step 612, UE 601 receives a REGISTRATION ACCEPT message over 3GPP access, the accept message carries UE access identity information, e.g., a first priority indicator IE. In step 621, UE 601 receives a CONFIGURATION UPDATE COMMAND message from PLMN2 over non-3GPP access 603, carrying a second UE access identity information, e.g., a second updated priority indicator IE with access priority level.

UE 601 then determines whether the UE is registered to the same or different PLMN/SNPN over 3GPP access and non-3GPP access. In the example of FIG. 6, UE 601 is registered to PLMN1 over 3GPP access 602 and is registered to PLMN2 over non-3GPP access 603. Therefore, UE 601 handles the UE access identity for 3GPP access and non-3GPP access as two independent sets of parameters. In another word, UE 601 handles and uses two independent access identity information, depending on whether UE 601 receives the access identity information from 3GPP access or from non-3GPP access. As a result, in step 631, UE 601 starts to apply the first priority indicator IE, e.g., act as being configured for "Access identity 1 valid" (MPS) in all NG-RAN of the registered PLMN1. For example, in step 641, UE 601 sets the establishment cause to "mps-priority access" in a subsequent RRC setup request message when UE 601 accesses PLMN1 via NG-RAN. On the other hand, in step 651, UE 601 starts to apply the second priority indicator IE, e.g., act as being configured for "Access identity 1 not valid" over non-3GPP of the registered PLMN2. For example, in step 661, UE 601 sets "Access identity 1 not valid" in a subsequent NAS signaling message when UE 601 accesses PLMN2 over non-3GPP.

Figure 7:
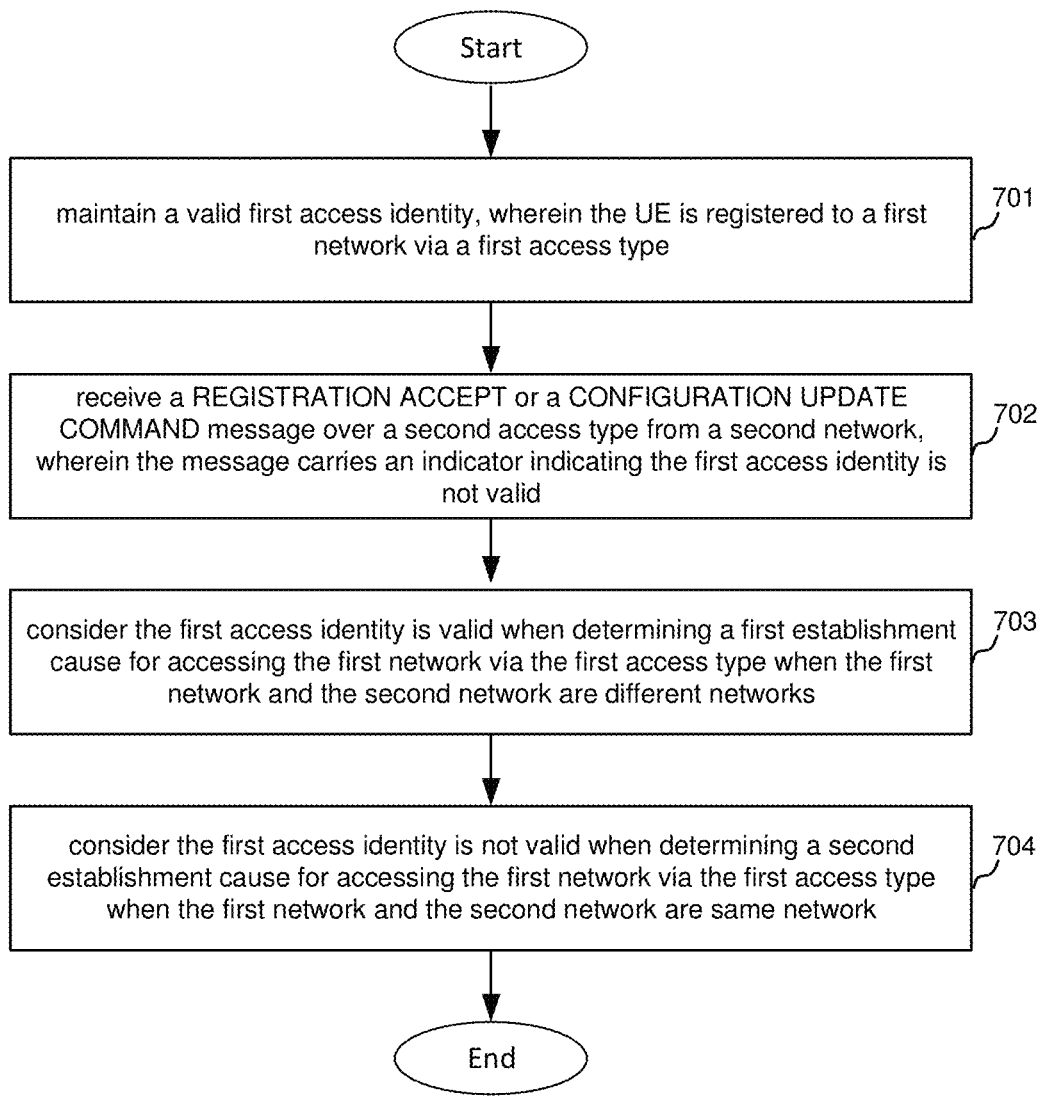
FIG. 7 is a flow chart of a method of determining UE access identity in accordance with one novel aspect of the present invention.

FIG. 7 is a flow chart of a method of determining UE access identity in accordance with one novel aspect of the present invention. In step 701, a UE maintains a valid first access identity, wherein the UE is registered to a first network via a first access type. In step 702, the UE receives a REGISTRATION ACCEPT or a CONFIGURATION UPDATE COMMAND message over a second access type from a second network, wherein the message carries an indicator indicating the first access identity is not valid. In step 703, the UE considers the first access identity is valid when determining a first establishment cause for accessing the first network via the first access type when the first network and the second network are different networks, otherwise, the UE considers the first access identity is not valid when determining a second establishment cause for accessing the first network via the first access type when the first network and the second network are same network.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    maintaining a valid first access identity by a User Equipment (UE), wherein the UE is registered to a first network via a first access type;
    receiving a REGISTRATION ACCEPT or a CONFIGURATION UPDATE COMMAND message over a second access type from a second network, wherein the message carries an indicator indicating the first access identity is not valid; and
    considering the first access identity is valid when determining a first establishment cause for accessing the first network via the first access type when the first network and the second network are different networks, otherwise,
    considering the first access identity is not valid when determining a second establishment cause for accessing the first network via the first access type when the first network and the second network are same network.

2. The method of claim 1, wherein the first access type is 3GPP access and the second access type is non-3GPP access, or the first access type is non-3GPP access and the second access type is 3GPP access.

3. The method of claim 1, wherein the UE registers to the first network, and wherein a REGISTRATION ACCEPT message or a CONFIGURATION UPDATE COMMAND message received over the first access type carries an indicator indicating the first access identity is valid.

4. The method of claim 1, wherein the UE maintains one common access identity when the first network and the second network are same network, and wherein the UE maintains two separate access identities when the first network and the second network are different networks.

5. The method of claim 1, wherein the first access identity is Access identity 1, and whether the Access identity 1 is valid or not is indicated by a Multimedia Priority Service (MPS) indicator bit.

6. The method of claim 1, wherein the first access identity is Access identity 2, and whether the Access identity 2 is valid or not is indicated by a Mission Critical Service (MCS) indicator bit.

7. The method of claim 1, wherein the first access type is 3GPP, wherein the UE performs an RRC connection setup procedure with the first network.

8. The method of claim 7, wherein the first access identity is Access identity 1, and wherein the first network and the second network are different networks and the UE determines the RRC establishment cause as "mps-PriorityAccess" when the UE transmits an RRC setup request message to the first network.

9. The method of claim 7, wherein the first access identity is Access identity 2, and wherein the first network and the second network are different networks and the UE determines the RRC establishment cause as "mcs-PriorityAccess" when the UE transmits an RRC setup request message to the first network.

10. The method of claim 1, wherein the second access type is non-3GPP, and wherein the UE performs a NAS signaling connection setup procedure with the second network.

11. A User Equipment (UE), comprising:
   a control circuit that maintains a valid first access identity, wherein the UE is registered to a first network via a first access type;
   a receiver that receives a REGISTRATION ACCEPT or a CONFIGURATION UPDATE COMMAND message over a second access type from a second network, wherein the message carries an indicator indicating the first access identity is not valid; and
   an access and connection handling circuit that considers the first access identity is valid when determining a first establishment cause for accessing the first network via the first access type when the first network and the second network are different networks, otherwise,
   the access and connection handling circuit considers the first access identity is not valid when determining a second establishment cause for accessing the first network via the first access type when the first network and the second network are same network.

12. The UE of claim 11, wherein the first access type is 3GPP access and the second access type is non-3GPP access, or the first access type is non-3GPP access and the second access type is 3GPP access.

13. The UE of claim 11, wherein the UE registers to the first network, and wherein a REGISTRATION ACCEPT message or a CONFIGURATION UPDATE COMMAND message received over the first access type carries an indicator indicating the first access identity is valid.

14. The UE of claim 11, wherein the UE maintains one common access identity when the first network and the second network are same network, and wherein the UE maintains two separate access identities when the first network and the second network are different networks.

15. The UE of claim 11, wherein the first access identity is Access identity 1, and whether the Access identity 1 is valid or not is indicated by a Multimedia Priority Service (MPS) indicator bit.

16. The UE of claim 11, wherein the first access identity is Access identity 2, and whether the Access identity 2 is valid or not is indicated by a Mission Critical Service (MCS) indicator bit.

17. The UE of claim 11, wherein the first access type is 3GPP, wherein the UE performs an RRC connection setup procedure with the first network.

18. The UE of claim 17, wherein the first access identity is Access identity 1, and wherein the first network and the second network are different networks and the UE determines the RRC establishment cause as "mps-PriorityAccess" when the UE transmits an RRC setup request message to the first network.

19. The UE of claim 17, wherein the first access identity is Access identity 2, and wherein the first network and the second network are different networks and the UE determines the RRC establishment cause as "mcs-PriorityAccess" when the UE transmits an RRC setup request message to the first network.

20. The UE of claim 11, wherein the second access type is non-3GPP, and wherein the UE performs a NAS signaling connection setup procedure with the second network.

* * * * *